Feb. 15, 1938.    J. C. LARSEN    2,108,378
CAR TRUCK CONSTRUCTION
Filed Sept. 24, 1934    2 Sheets-Sheet 1
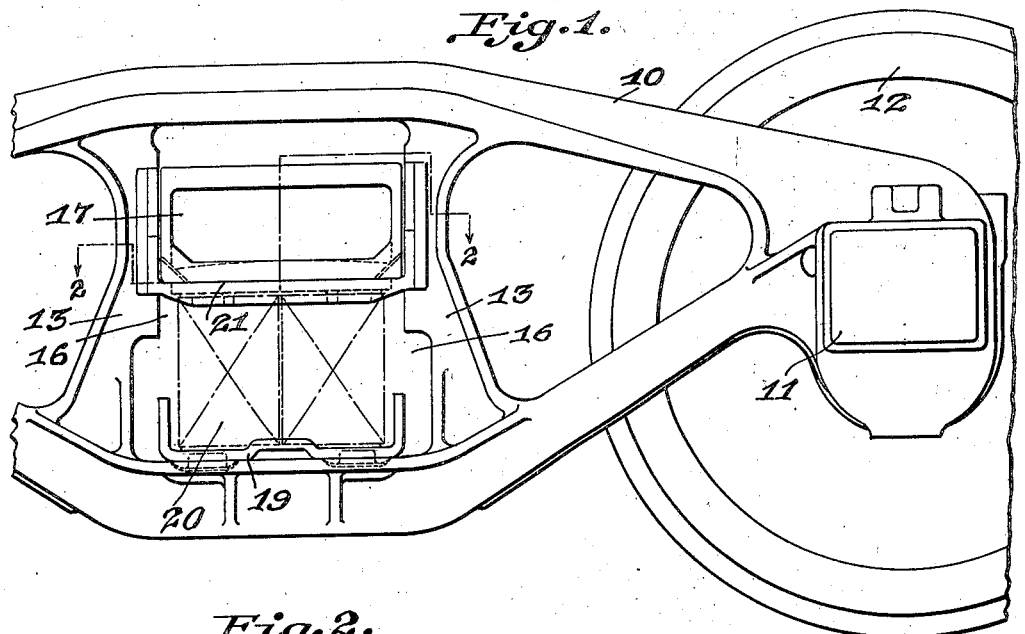
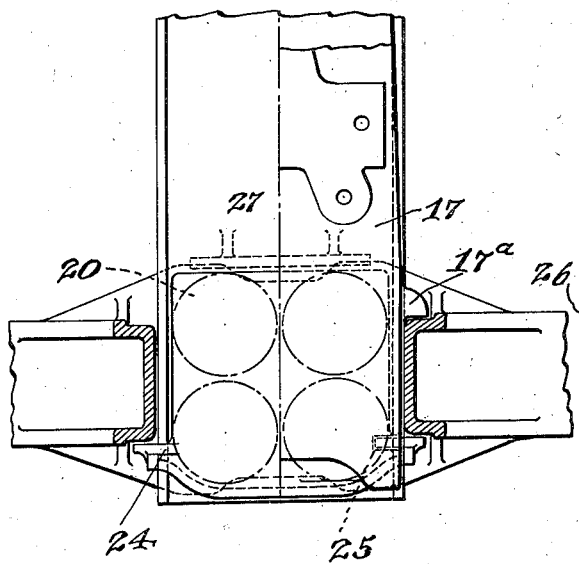
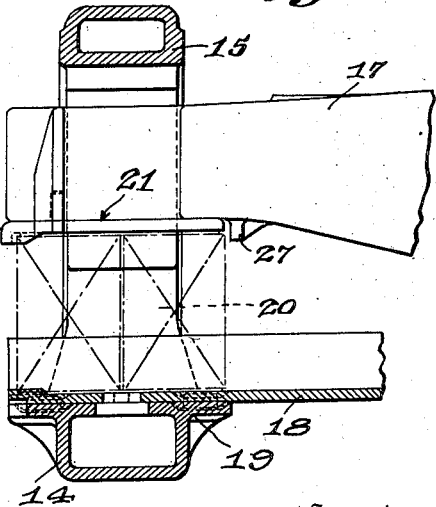
Inventor
Jacob C. Larsen
By Seymour & Bright
Attorneys Feb. 15, 1938.  J. C. LARSEN  2,108,378
CAR TRUCK CONSTRUCTION
Filed Sept. 24, 1934   2 Sheets-Sheet 2
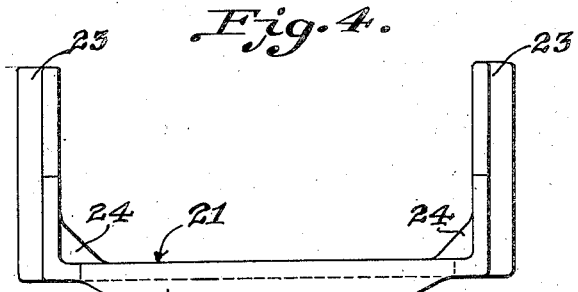
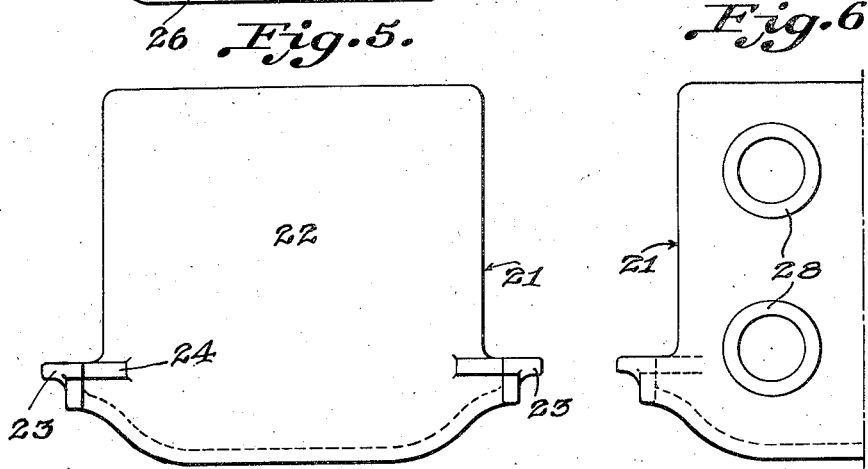
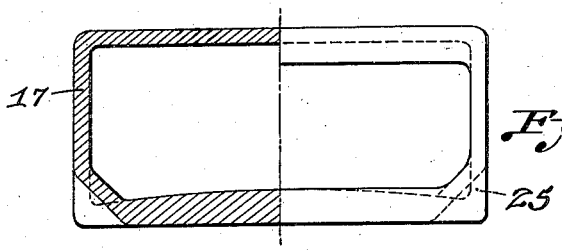
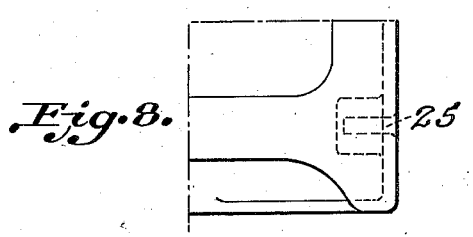
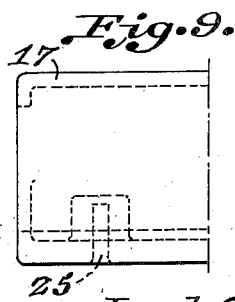
Inventor
Jacob C. Larsen
By Seymour & Bright
Attorneys Patented Feb. 15, 1938

2,108,378

UNITED STATES PATENT OFFICE 2,108,378

CAR TRUCK CONSTRUCTION

Jacob C. Larsen, Bexley, Ohio, assignor to The Buckeye Steel Castings Company, Columbus, Ohio Application September 24, 1934, Serial No. 745,355

1 Claim. (Cl. 105—197)

This invention relates to improvements in car truck constructions, and more particularly to car trucks of the quick-wheel-change type.

The present day fast operation of freight trains has shown a marked increase in truck spring losses, which is due to the failure of the usual light spring caps to hold the springs in place. The springs, when thus loosened, gradually work out from beneath the bolster and are lost. This tendency to work out is increased when the truck is rounding curves in the track at present high speeds.

It is therefore the primary object of my invention to eliminate the above difficulty by providing a truck spring guard or retainer attached to a substantial member of the truck.

A further object is to provide truck spring guards or retainers integrally attached to a substantial member of a quick-wheel-change type of truck in a manner that will obviate the necessity of excessive separation of members of the truck in order to remove the parts necessary for the quick changing of wheels.

A still further object is to provide a spring retainer on a truck bolster to prevent the springs from moving inwardly.

Another object is to combine in a car truck, a spring guard and bolster of the above character whereby the springs of said truck may be effectively prevented from moving inwardly or outwardly with respect to the side frame of said truck.

With the foregoing objects outlined and with other objects in view which will appear as the description proceeds, the invention consists in the novel features hereinafter described in detail, illustrated in the accompanying drawings, and more especially pointed out in the appended claim.

In the drawings,

Fig. 1 is a side elevation of the assembled truck.

Fig. 2 is a sectional view taken on the line 2—2 of Fig. 1.

Fig. 3 is a vertical sectional view of the assembled truck partly in elevation.

Figs. 4 and 5 are an end elevation and top plan view respectively, of the combined spring cap or guard and column guide.

Fig. 6 is a partial bottom plan view of a modification of the spring cap shown in Figs. 4 and 5.

Fig. 7 is an end elevation partly in section of the bolster member of the assembly.

Figs. 8 and 9 are partial top plan and side elevation views respectively of the bolster member.

Referring to the drawings, 10 designates a portion of a car truck side frame having an integral journal box 11 for the axle (not shown) of the wheels 12. As is usual in car trucks of the quick-wheel-change type, the side frame includes columns 13, a lower or tension member 14 and an upper or compression member 15; said columns and members 14 and 15 defining a bolster opening 16, through which an end portion of a bolster 17 passes. The bolster is provided with inner lugs 17a which abut against the inner sides of the columns 13 to limit the inward movement of the side frame with respect to the bolster. A spring plank 18 also extends into this opening and supports a spring seat 19 on which the springs 20 are mounted.

In accordance with my invention a metal casting 21 is employed to form a spring cap to insure a uniformly distributed load over the upper surface of the individual springs, and to provide column guides. This casting includes a plate 22 that rests on the upper ends of the springs, and has a pair of upwardly extending posts 23 which form the column guides.

As best shown in Figs. 4 to 9 inclusive, I provide the spring cap with lugs or projections 24 preferably formed integral with the bottom and columns of said spring cap. These brackets are adapted to interlock with recesses 25 provided in the end portion of the bolster 17. The upstanding lugs or columns 23 of the spring cap provide an outside column guide for the bolster, and when the spring cap is interlocked with the bolster by means of the brackets and recesses above described, it will be seen that the side frame will be prevented from moving outwardly with respect to the bolster.

In order to prevent the springs from moving outwardly and becoming lost, I provide the spring cap with an apron or depending flange 26 which is preferably arranged at the outer edge of the cap and may be formed integral with said cap or otherwise suitably secured thereto. As shown in Figs. 1 and 3, this flange preferably overhangs the outer portion of the springs 20 a distance sufficient to effectively prevent outward movement of the latter when the car truck is rounding curves at high speeds.

Referring specifically to Fig. 3 it will be observed that I have also provided an inner spring retainer comprising a flange or apron 27 depending from and preferably formed integrally with the bolster 17. As may be seen in the drawings, this lug will prevent the inward movement of the springs 20 without interfering with the removal of the members necessary for the quick changing of wheels. This arrangement of the lug 27 on the bolster is preferable with trucks of the quick-wheel-change type, but it will be understood that I may, if desired, with car trucks of other types, integrally attach said lug to the spring cap 21 and accomplish the same purpose.

With a construction of the character described, it will be appreciated that when the bolster is raised to disengage the brackets 24 from the recesses 25, the spring cap may then be removed, and the spring plank, springs, and bolster raised as a unit after which the side frames may be disengaged from the axle journals and moved outwardly, thereby releasing the wheels and axles for making a change.

While I have shown the spring cap as simply resting on the upper surfaces of the springs 20, I may, if desired, provide depending embossments or spuds 28 on said cap as shown in Fig. 6. A number of such embossments, corresponding to the number of springs in the bolster opening 16 will be provided, and each embossment will engage the upper surface of its corresponding spring to further retain the springs within said opening.

From the foregoing, it will be seen that I have provided a car truck construction in which the spring cap and bolster will cooperate to effectively prevent lateral movement of the springs, while at the same time permitting the customary quick changing of wheels in car trucks of this type.

While I have disclosed what I now consider to be a preferred embodiment of my invention in such manner that the same may be readily understood by those skilled in the art, it is manifest that changes may be made in the details disclosed without departing from the spirit of the invention as expressed in the claim.

What I claim and desire to secure by Letters Patent is:

In a car truck of the quick-wheel-change type, a side frame having a bolster opening and column guides, a spring plank extending into said opening, springs resting on the spring plank, a spring cap resting on said springs and provided with means for limiting outward movement of said springs, said spring cap being provided with upstanding posts engageable with said columns for guiding the spring cap vertically, a bolster having an end portion extending into said opening and resting on the spring cap, the opposite sides of the end portion of the bolster being shaped to readily move through the upper end portion of the bolster opening, the top of the end portion of the bolster being normally spaced from the top of the side frame to allow the bolster to be raised relative to the spring cap, means interlocking said bolster and cap and permitting detachment of the cap when the bolster is elevated relatively to the cap a distance less than the height of said posts, and a lug depending from the bolster for limiting inward movement of the upper end portions of said springs.

JACOB C. LARSEN.